United States Patent
Hölzle et al.

(10) Patent No.: US 6,919,066 B2
(45) Date of Patent: Jul. 19, 2005

(54) PREPARATION OF CATALYSTS HAVING LOW VOLUME SHRINKAGE

(75) Inventors: Markus Hölzle, Kirchheim (DE); Michael Jolyon Sprague, Mannheim (DE); Klaus Harth, Altleiningen (DE); Wolfgang Jürgen Pöpel, Darmstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 12 days.

(21) Appl. No.: 10/090,763

(22) Filed: Mar. 6, 2002

(65) Prior Publication Data

US 2002/0169075 A1 Nov. 14, 2002

(30) Foreign Application Priority Data

Mar. 8, 2001 (DE) .......................................... 101 11 197

(51) Int. Cl.⁷ ................................................ C01B 3/26
(52) U.S. Cl. .................... 423/648.1; 252/373; 423/656; 502/345; 502/346
(58) Field of Search ...................... 252/373; 423/648.1, 423/655, 656, 247, 437.2; 502/345, 346

(56) References Cited

U.S. PATENT DOCUMENTS

| 4,305,842 A | 12/1981 | Asakawa et al. ............. 252/432 |
| 5,345,005 A | 9/1994 | Thakur et al. .............. 568/885 |
| 5,928,985 A | 7/1999 | Williams .................... 502/345 |
| 6,051,163 A | 4/2000 | Kumberger et al. ......... 252/373 |
| 6,171,992 B1 | 1/2001 | Autenrieth et al. ........... 502/55 |
| 6,355,589 B1 | 3/2002 | Autenrieth et al. ........... 502/38 |
| 2002/0193248 A1 * | 12/2002 | Holzle et al. ............... 502/345 |

FOREIGN PATENT DOCUMENTS

| DE | 195 05347 | 9/1995 |
| DE | 197 25 006 | 12/1998 |
| DE | 197 39 773 | 3/1999 |
| DE | 198 01 373 | 7/1999 |
| EP | 0 296 734 | 12/1988 |
| EP | 884 270 | 12/1998 |
| EP | 884 272 | 12/1998 |
| EP | 1 077 081 | 2/2001 |
| SU | 728908 | 4/1998 |

* cited by examiner

Primary Examiner—Stanley S. Silverman
Assistant Examiner—Maribel Medina
(74) Attorney, Agent, or Firm—Novak Druce & Quigg

(57) ABSTRACT

Catalysts containing passivated copper and zinc oxide and/or alumina are prepared by
(1) precipitating a mixture of catalyst precursor components dissolved or suspended in a diluent with anion-containing precipitating agents, washing and drying to form a solid catalyst precursor in the form of powder or granules,
(2) calcining the solid catalyst precursor obtained in stage (1) to an anion content from the precipitating agent of from 0.1 to 2.5% by weight and
(3) shaping and, if required, reducing and passivating the calcined catalyst precursor from stage (2) in any desired order to form the catalyst.

9 Claims, No Drawings

PREPARATION OF CATALYSTS HAVING LOW VOLUME SHRINKAGE

The present invention relates to processes for the preparation of catalysts, in particular of methanol reforming catalysts, having low volume shrinkage and the use of these catalysts for the steam reforming of methanol and of higher alcohols, for the partial oxidation of hydrocarbons for hydrogen production or as CO shift catalysts.

In vehicles having a fuel cell drive, the required hydrogen is advantageously produced from a liquid fuel only during driving. In the case of methanol as fuel, this is effected primarily by means of steam reforming, autothermal reforming or partial oxidation. With the use of hydrocarbons as fuel, hydrogen production by means of partial oxidation or autothermal partial oxidation is possible. The CO always concomitantly formed as the main product or a byproduct must either be removed by a water gas shift or must be converted by selective oxidation into $CO_2$, which is not harmful for the fuel cell.

The steam reforming of methanol and the CO shift reaction are accelerated by Cu-containing catalysts. In general, these substances have the predominant chemical composition CuO/ZnO/MeO where MeO is, for example, $Al_2O_3$, $ZrO_2$, $La_2O_3$ or $Cr_2O_3$. Such catalysts are prepared in oxide form and then generally activated in the reactor under reducing conditions, the CuO then being converted into elemental Cu, the actual catalytically active species. The reduction of such catalysts is always associated with a volume and mass shrinkage of the catalyst molding. This is typically of the order of magnitude of from 10 to 25%. In a completely filled reactor (e.g. a tube-bundle reactor or a plate-type heat exchanger reactor), up to a fourth of the reaction space remains unused as a result of this. This is undesirable particularly in the case of mobile reformers which are designed to be as compact as possible.

The use of catalysts for hydrogen production in mobile applications, primarily in cars operated by fuel cells, sets general conditions which go well beyond what is necessary in the case of industrial applications.

Thus, owing to the small space available in the car, the size of the reactors is also greatly limited. The reaction space present in the reactor must be completely filled with catalyst so that no excess empty volume is present. The empty space formed can eliminate the fixing of the catalyst. If the catalyst is present, for example, as a bed, the catalyst pellets may then fly around owing to the high mechanical loads during driving. This can lead to a substantial increase in the abrasion This abrasion is undesirable since it can lead to blockages or other impairment of downstream components.

An additional problem may arise when the reformers are directly heated. A heat transfer liquid is dispensed with here and instead the heat required for the reforming is generated directly by catalytic combustion of hydrogen or methanol. In such a method of heat generation, overheating can rapidly occur if parts of the reactor tubes or reactor plates are not in contact with the catalyst. Such overheating leads on the one hand to material fatigue in the reactor but on the other hand can also lead to coking of the fuel used.

The problem of volume shrinkage has long been known and potential solutions to it have also been described. Thus, EP-A-0 884 272 relates to the preaging of a copper-based catalyst by methanol reforming for about 50 hours. The preaging can be carried out in a separate reactor or in the actual reformer reactor, it being necessary to replenish the catalyst several times in the last-mentioned case.

EP-A-0 884 270 relates to another pretreatment process for the same catalyst system. Here, the catalyst is preaged under an inert or oxidizing atmosphere at >300° C. In such a pretreatment, which in principle constitutes a further calcination, only low volume shrinkages can however be achieved.

However, both approaches, according to EP-A 0 884 272 and EP-A 0 884 270, include in principle a further preparation step in addition to the actual catalyst preparation. The steps are expensive (in particular EP-A 0 884 272) and should as far as possible be avoided.

An adverse effect which also constantly occurs in the reduction of catalysts is a reduction in the mechanical stability. Particularly in the case of catalysts in tablet form, this hardness after removal (lateral compressive strength/end face compressive strength) is often only a fraction of the initial hardness measured when the catalyst is still in oxide form. However, the low mechanical stability of the tablets is undesirable in mobile reformers. If, for example, a compacted bed is present in the form of catalyst tablets, there is always a certain friction of the tablets against one another during driving, which can lead to increased abrasion, in particular at the corners and edges of the tablets. This abrasion is not dependent on whether a cavity forms above the bed due to volume shrinkage.

For obtaining mechanically stable catalyst tablets in the reduced state too, there are various approaches which, on the one hand, aim at improving the active material and, on the other hand, also describe tableting additives for increasing the mechanical stability. Thus, DE-A-195 05 347 describes a process in which a Cu-containing catalyst is tableted by adding copper powder or aluminum powder. This leads to a substantial increase in the hardness of the catalyst in the reduced state too. However, a disadvantage of this process is that the activity of such catalysts is always lower than the activity of comparable catalysts without added metal.

It is an object of the present invention to provide a process for the preparation of a catalyst which exhibits greatly reduced or no volume shrinkage in combination with substantially increased mechanical strength subsequently during operation. Such catalysts are preferably used for the steam reforming of methanol or higher alcohols, for the partial oxidation of hydrocarbons or as CO shift catalysts. This should apply in particular to catalysts which are arranged in a reactor and as a rule used in the form of moldings. The volume lost when operation is started should preferably be not more than 5%, particularly preferably not more than 4%. Moreover, the catalysts prepared according to the invention should have a high mechanical hardness in addition to a low volume shrinkage.

We have found that this object is achieved, according to the invention, by a process for the preparation of catalysts, in particular of methanol reforming catalysts, containing passivated copper and zinc oxide and/or alumina by (1) precipitating a mixture of catalyst precursor components dissolved or suspended in a diluent with anion-containing, in particular carbonate-containing, precipitating agents, washing and drying, e.g. spray-drying, to form a solid catalyst precursor in the form of powder or granules, (2) calcining the solid catalyst precursor obtained in stage (1) to an anion content from the precipitating agent, in particular carbonate content, determined as $CO_3$, of from 0.1 to 2.5% by weight and (3) shaping and, if required, reducing and passivating the calcined catalyst precursor from stage (2) in any desired order to form the catalyst.

Said ingredients are preferably the main ingredients of the catalyst.

We have found that this object is also achieved, according to the invention, by catalysts obtainable by the process and a process for reducing the volume shrinkage during operation of (methanol reforming) catalysts, in which the (methanol reforming) catalysts are prepared by the above process.

The anion content in stage (2) generally means the anions of the precipitating agent which remain in the catalyst precursor after the precipitation. Residual carbonate is found when a carbonate-containing precipitating agent, e.g. sodium carbonate, is used. This is as a rule also the case for industrial products. It is of course also possible to use an alkali or oxalic acid as the precipitating agent. This would then lead to residual hydroxide and to residual oxalate, respectively.

The present invention also relates to a process for the steam reforming of methanol by reacting methanol and water over such a catalyst, preferably at from 0.5 to 10 bar and at from 150 to 450° C.

The present invention also relates to a process for CO conversion by reaction with water over such a catalyst, for the formation of carbon dioxide and hydrogen.

The catalysts prepared by the novel process have a volume shrinkage during or after operation of preferably less than 5%, particularly preferably less than 4%, in combination with high mechanical strength during operation, i.e. in the reduced state.

Both are achieved by calcining a catalyst precursor comprising basic metal salts, such as oxalates, hydroxides or in particular metal carbonates, in such a way that a defined amount of residual anions, in particular residual carbonate, remains in the catalyst. The amount is from 0.1 to 2.5, preferably from 0.2 to 2.0, in particular from 0.3 to 1.5, % by weight. This can be controlled by choice of the temperature and duration for the calcination. However, the temperature should not be too high since the catalyst may otherwise be irreversibly damaged. Advantageously, the dried precipitated powder generally present in the form of the spray-dried powder in the case of industrial production is used for this process. The powder calcined according to the invention can then be further processed to give moldings, inter alia the following steps being possible:

Precompaction and tableting of the powder pretreated according to the invention to give tablets.

Conversion into a slurry, kneading/grinding in a pan mill and extrusion to give extrudates.

Conversion into a slurry, kneading/grinding in a pan mill and extrusion to give complex moldings, such as monolithic structures or catalyst plates with or without secondary structure.

Application of the catalytically active material to inert or likewise catalytically active supports by means of hicoating or similar processes.

In all processes, the use of binders and additives is of course also permitted. Numerous other possibilities for further processing are also possible.

The procedure described permits the production of moldings having low volume shrinkage during operation as a catalyst, high mechanical stability during operation in the reduced state.

The novel catalysts have a low volume shrinkage in combination with high mechanical strength. The novel catalyst is distinguished in particular by the combination of the two properties, low volume shrinkage with high mechanical strength.

A major advantage of the invention is that the shrinkage reduced according to the invention is not achieved at the expense of an additional process step but that a typical process step in the catalyst preparation, i.e. the calcination, is optimized with respect to the anion content, in particular $CO_3$ content. Moreover, no further additive is necessary in order to achieve the reduction in the volume shrinkage. Additives of any type inevitably reduce the proportion of the catalytically active material per reactor volume. On the other hand, the calcination is an absolutely usual step in the preparation of a precipitated catalyst in order to convert the precursors formed in the precipitation into the catalytically active species. The chosen temperatures are typically about 300° C. but may also be substantially lower or higher, preferably from 200 to 400° C., in particular from 250 to 350° C.

However, these temperatures may also change depending on the catalyst system. Thus, catalysts precipitated by means of alkaline generally require higher temperatures to achieve the desired effect. The temperatures also depend on the furnace used (muffle furnace in the laboratory, rotary tubular furnace in industry) and may often be the temperatures set on the controller, it being possible for the internal temperatures of the furnaces, in particular in the case of rotary tubular furnaces, sometimes to deviate substantially therefrom. In addition to the temperature of the calcination, the duration of the calcination may also be important for the performance of the prepared catalyst. Here, however, the window is dependent on the throughput of the industrial rotary tubes and is preferably from 0.1 to 1, in particular from 0.2 to 0.6, hour, generally in the region of one hour.

The large number of publications in the literature on the preparation of Cu-containing catalysts, in particular of Cu—Zn—Al mixed oxide catalysts, does not reveal that the residual anion content, in particular residual carbonate content, of a catalyst was established in a controlled manner in order to obtain an optimum volume shrinkage. Rather, the typical content of residual anions, in particular residual carbonate, is frequently more than 5 and up to 10%. The residual carbonate content (residual hydroxide content) is not stated in most publications. The residual carbonate content may be dependent on the chemical composition of the active material but is primarily dependent on the method of calcination.

In most publications, the term loss on ignition is used instead of anion content. Both quantities refer to the residual amount of decomposable anions in the product. Loss on ignition is determined by simple heating at 900° C., whereas the anion content is determined by means of chemical analysis.

Thus, EP-A-0 034 338 and EP-A-0 152 809 describe copper-based catalysts for the preparation of methanol and higher alcohols. In EP-A-0 034 338, typical losses on ignition for the example catalysts are mentioned in Table 1. They are from 5 to 8%, as would also be expected from the stated calcination conditions (3 hours at 400° C.). The table also shows that the loss on ignition is dependent primarily on the level and duration of the calcination and to a lesser extent on the chemical composition of the catalysts.

EP-A-0 152 809 describes similar catalyst systems, likewise suitable for the preparation of methanol and higher homologs. Here, the loss on ignition of the catalysts stated in Table 1 is from 10 to 15% by weight. These relatively high values arise because catalysts were calcined only at temperatures of about 280° C.

According to the invention, a relationship has now been found between volume shrinkage and hardness of the catalyst after removal on the one hand and the residual anion content, in particular residual carbonate content, on the other hand, which permits the controlled optimization of the parameters and hence of the catalysts.

In the novel process, in stage (3), the calcined catalyst precursor from stage (2) can first additionally be reduced, then passivated and then subjected to the shaping process. It is also possible for the calcined catalyst precursor from stage (2) first to be subjected to the shaping process and then to be reduced, the catalyst obtained often no longer being pyrophoric and it therefore being possible to dispense with passivation.

The methanol reforming catalysts prepared according to the invention are catalysts containing copper (as a rule passivated) and zinc oxide or magnesium oxide. Preferably, the catalyst contains alumina in addition to copper and zinc oxide and is prepared in stage (1) by precipitation of solutions of zinc, aluminum and copper salts. The precipitation can be effected in a suitable manner in any desired order.

In addition to copper and zinc oxide, suitable catalysts may contain alumina, at least some of which may be replaced by corresponding oxides of zirconium, chromium, manganese, lanthanum or yttrium.

The preparation of the catalyst precursor from stage (1) is preferably effected by
(a) precipitating a solution of zinc and aluminum salts, the atomic Zn:Al ratio being 3:1–1:3, with an alkali metal carbonate solution at a pH of from 5 to 12 and at from 20 to 100° C.,
(b) separating off and washing the precipitate to remove alkali metal ions,
(c) drying the precipitate,
(d) calcining the precipitate at from 250 to 800° C. to give a mixed oxide,
(e) dispersing the mixed oxide in an acidic solution of copper and zinc salts, the atomic Cu:Zn ratio of the solution being from 1:5 to 20:1,
(f) precipitating the dispersion with an alkali metal carbonate solution at a pH of from 6 to 9 and at from 20 to 100° C.,
(g) carrying out steps (b) to (d),
it being possible for the solutions in steps (a) and/or (e) additionally to contain salts or oxides of one or more elements of the platinum metals of groups 4, 5 and 11 and of the lanthanides of the Periodic Table of the Elements or for the salts or oxides to be applied to the mixed oxides.

The chemical composition of the catalysts thus prepared may vary within wide limits. Preferably, the atomic Cu:Zn ratio is from 1:5 to 5:1, particularly preferably from 1:1 to 4:1, in particular from 2:1 to 3:1. The atomic (Cu+Zn):Al ratio is preferably from 99:1 to 70:30, particularly preferably from 95:5 to 80:20. A Cu:Zn:Al ratio of about 65:25:10 is especially preferred.

The preparation of such catalysts is described in general form in DE-A-197 39 773. For the individual preparation steps, reference may be made to this publication.

In addition to the three elements Cu, Zn and Al, it is also possible to introduce further elements into the catalyst, such as platinum metals, elements of groups 4, 5 and 11 and of the lanthanides of the Periodic Table of the Elements. Preferred examples are Pd, Pt, Rh, Ru, Os, Au, Zr, Ti, V, Nb, Ta and the lanthanides. They may be added, for example, in the form of salts or oxides to the solutions in the above steps (a) and/or (e) or may be applied as salts or oxides to the mixed oxides.

The catalysts prepared by the novel process can be used for the steam reforming of methanol or higher alcohols, such as $C_{2-12}$-alcohols, for the partial oxidation of hydrocarbons, for hydrogen production or as CO shift catalysts.

The present invention is to be illustrated by two examples which show the positive effect of the low residual carbonate content on the volume shrinkage and the hardness of Cu-containing catalysts after removal. Copper catalysts prepared in different ways are chosen in order to show the general applicability of the effect. In addition, the corresponding comparative examples are intended to show that, with correspondingly higher carbonate contents, the volume shrinkage of the catalyst is also substantially increased. Simultaneously with this, the hardness of the catalyst in the removed state decreases.

EXAMPLE 1

A copper catalyst is prepared analogously to EP-A-0 296 734 (example 1). The composition in atom % is: Cu=65%, Zn=25%, Al=10%. The precipitated product of the second precipitation stage is washed sodium-free and is dried at 120° C. A part of the dried product is then calcined at 300° C. for 1 hour in a rotary tubular furnace and is comminuted to give chips of from 0.5 to 0.7 mm (catalyst 1a).

A further part of the precipitated product is calcined at 400° C. for one hour in the rotary tubular furnace and is then comminuted to give chips of from 0.5 to 0.7 mm (catalyst 1b).

A further part of the precipitated product is calcined at 500° C. for one hour in the rotary tubular furnace and is then comminuted to give chips of from 0.5 to 0.7 mm (catalyst 1c).

The calcined products are then precompacted and are tableted on a tablet press to give small 1.5×1.5 mm tablets. The tableting is carried out in such a way that the lateral compressive strength of the tablets is from 30 to 40 N.

The BET surface areas and the carbonate contents (2 hours at 900° C.) of the prepared tablets were determined. The following BET surface areas and carbonate contents are obtained:

| Designation | Calcination | BET surface area [m²/g] | Carbonate content |
|---|---|---|---|
| Catalyst 1a | 1 h 300° C. | 59.7 | 10% |
| Catalyst 1b | 1 h 400° C. | 93.0 | 3% |
| Catalyst 1c | 1 h 500° C. | 66.2 | 0.3% |

EXAMPLE 2

A copper catalyst is prepared analogously to DE-A-35 20 832 (catalyst 1). The composition in % by weight is: CuO=40%, ZnO=40%, $Al_2O_3$=20%. The precipitated product is washed sodium-free and is dried at 120° C. The total product is then calcined at 300° C. for 1 hour in a rotary tubular furnace and is comminuted to give chips of from 0.5 to 0.7 mm (catalyst 2a).

A further part of the precipitated product is calcined at 375° C. for one hour in the rotary tubular furnace and is then comminuted to give chips of from 0.5 to 0.7 mm (catalyst 2b).

A further part of the precipitated product is calcined at 430° C. for one hour in the rotary tubular furnace and is then comminuted to give chips of from 0.5 to 0.7 mm (catalyst 2c).

The calcined products are then precompacted and are tableted on a tablet press to give small 1.5×1.5 mm tablets.

The tableting is carried out in such a way that the lateral compressive strength of the tablets is from 25 to 40 N/tablet.

The BET surface areas and the carbonate contents (2 h at 900° C.) of the prepared tablets were determined. The following BET surface areas and carbonate contents are obtained:

| Designation | Calcination | BET surface area [m²/g] | Carbonate content |
| --- | --- | --- | --- |
| Catalyst 2a | 300° C. | 103.1 | 10% |
| Catalyst 2b | 375° C. | 96.3 | 3% |
| Catalyst 2c | 430° C. | 83.4 | 0.3% |

Catalyst Test for Catalysts from Examples 1 and 2:

The catalysts are introduced into a tubular reactor (diameter 10 mm; amount introduced=10 ml) and a 1.5 m/m mixture of methanol and water is passed over them at 280° C. and 2 bar. Before the reaction, the catalysts are activated with 1% of $H_2$ in $N_2$ at 200° C. for several hours; after the test, passivation is effected with dilute air at room temperature. The catalysts are operated under reaction conditions for from 20 to 40 hours. All catalysts have a comparable methanol conversion and hence also a comparable evolution of hydrogen. The catalysts removed are measured with respect to volume shrinkage and lateral compressive strength. For the determination of the volume shrinkage, a specific number of tablets is measured by means of a caliper gage to +/−0.01 mm. The lateral compressive strength is determined by means of a commercial hardness tester. The results are summarized in the table below:

TABLE

Lateral compressive strength and volume shrinkage after catalyst test:

| Catalyst | Volume shrinkage after test [% by vol.] | Lateral compressive strength before installation [N/tablet] | Lateral compressive strength after test [N/tablet] |
| --- | --- | --- | --- |
| Catalyst 1a | 16.0 | 45.3 | 6.7 |
| Catalyst 1b | 22.4 | 51.0 | 7.4 |
| Catalyst 1c | 3.7 | 37.0 | 14.9 |
| Catalyst 2a | 9.9 | 27.0 | 11.2 |
| Catalyst 2b | 8.0 | 43.8 | 32.3 |
| Catalyst 2c | 1.1 | 42.0 | 33.15 |

Catalysts 1a, 1b, 2a, 2b = comparison

We claim:

1. A process for the preparation of a catalyst containing passivated copper and zinc oxide and/or alumina by
   (1) precipitating a mixture of catalyst precursor components dissolved or suspended in a diluent with anion-containing precipitating agents, washing and drying to form a solid catalyst precursor in the form of powder or granules,
   (2) calcining the solid catalyst precursor obtained in stage (1) to an anion content from the precipitating agent of from 0.1 to 2.5% by weight by choice of the temperature and duration for the calcination and,
   (3) shaping and, if required, reducing and passivating the calcined catalyst precursor from stage (2) in any desired order to form the catalyst.

2. A process as claimed in claim 1, wherein, in stage (3), the calcined catalyst precursor from stage (2) is first reduced, then passivated and then subjected to the shaping process.

3. The process as claimed in claim 1, wherein the catalyst contains alumina in addition to copper and zinc oxide, and solutions of zinc, aluminum and copper salts are precipitated simultaneously or in any desired order in stage (1).

4. The process as claimed in claim 1, wherein the precipitation in stage (1) is carried out by adding carbonates and the carbonate content is determined as $CO_3$.

5. The process as claimed in claim 1, wherein stage (1) is carried out as follows:
   (a) precipitating a solution of zinc and aluminum salts, the atomic Zn:Al ratio being 3:1–1:3, with an alkali metal carbonate solution at pH of from 5 to 12 and at from 20 to 100° C.,
   (b) separating off and washing the precipitate to remove alkali metal ions,
   (c) drying the precipitate,
   (d) calcining the precipitate at from 250 to 800° C. to give a mixed oxide,
   (e) dispersing the mixed oxide in an acidic solution of copper and zinc salts, the atomic Cu:Zn ratio of the solution being 1:5 to 20:1,
   (f) precipitating the dispersion with an alkali metal carbonate solution at a pH of from 6–9 and at from 20 to 100° C.,
   (g) carrying out steps (b) to (d),
   it being possible for the solution in steps (a) and/or (e) additionally to contain salts or oxides of one or more elements of the platinum metals of groups 4, 5, and 11 and of the lanthanides of the Periodic Table of the Elements or for the salts or oxides to be applied to the mixed oxides.

6. A catalyst obtained by the process as claimed in claim 1.

7. A process for the steam reforming of methanol by reacting methanol and water over a catalyst as claimed in claim 6 at from 0.5 to 10 bar and at from 150 to 450° C.

8. A process for CO conversion with water to form $CO_2$ and hydrogen, wherein the reaction is carried out over a catalyst as claimed in claim 6.

9. The catalyst as claimed in claim 6 wherein the volume shrinkage of the catalyst is less than 5% during the operation of the catalyst.

* * * * *